(12) United States Patent
Crowley (10) Patent No.: US 11,326,527 B2
(45) Date of Patent: May 10, 2022

(54) VALVE APPARATUS

(71) Applicant: AIRBUS OPERATIONS LIMITED, Bristol (GB)

(72) Inventor: Michael Crowley, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 68 days.

(21) Appl. No.: 16/259,321

(22) Filed: Jan. 28, 2019

(65) Prior Publication Data

US 2019/0234314 A1    Aug. 1, 2019

(30) Foreign Application Priority Data

Jan. 29, 2018    (GB) ...................................... 1801439

(51) Int. Cl.
| | |
|---|---|
| *F02C 9/28* | (2006.01) |
| *F16K 37/00* | (2006.01) |
| *B64D 37/00* | (2006.01) |
| *F02C 7/232* | (2006.01) |
| *F02C 7/236* | (2006.01) |
| *F02C 9/26* | (2006.01) |

(52) U.S. Cl.
CPC .............. *F02C 9/28* (2013.01); *B64D 37/005* (2013.01); *F02C 7/232* (2013.01); *F02C 7/236* (2013.01); *F16K 37/0041* (2013.01); *F02C 9/263* (2013.01)

(58) Field of Classification Search
CPC .... F16K 37/0058; F16K 37/0083; F02C 9/28; Y10T 137/8242; Y10T 137/8275
See application file for complete search history.

(56) References Cited

U.S. PATENT DOCUMENTS

| | | | | |
|---|---|---|---|---|
| 1,419,145 | A | * | 6/1922 | Kleinberg .............. B60K 15/06 137/576 |
| 3,717,171 | A | * | 2/1973 | Fawkes ............... F16K 37/0058 137/552 |
| 4,304,630 | A | | 12/1981 | Tanner |
| 6,189,565 | B1 | | 2/2001 | Skog |

(Continued)

FOREIGN PATENT DOCUMENTS

| | | |
|---|---|---|
| DE | 20 2009 003748 | 6/2009 |
| EP | 0 962 685 | 12/1999 |

(Continued)

OTHER PUBLICATIONS

European Search Report for European Application No. 19152652.4, 12 pages, dated Jun. 28, 2019.

(Continued)

*Primary Examiner* — Reinaldo Sanchez-Medina
*Assistant Examiner* — Nicole Gardner
(74) *Attorney, Agent, or Firm* — Nixon & Vanderhye P.C.

(57) ABSTRACT

A valve apparatus for an aircraft fluid system is disclosed including a valve housing and a valve member. The valve member is configured to move between a first position in which fluid is able to flow along the fluid flow path, and a second position in which the fluid flow path restricted. A valve member drive means is configured to operate the valve member via an actuator external to the housing. The valve apparatus further includes a sensor configured to monitor a feature in the housing to determine the position of the valve member.

13 Claims, 6 Drawing Sheets

(56) References Cited

U.S. PATENT DOCUMENTS

2003/0194481 A1* 10/2003 Lippelt .................. G01B 11/14
427/8
2011/0042593 A1    2/2011  Wilby
2018/0245698 A1    8/2018  Musolf

FOREIGN PATENT DOCUMENTS

EP        2 653 762      10/2013
WO     2011/150966     12/2011
WO     2012/126124      9/2012

OTHER PUBLICATIONS

Combined Search and Examination Report for GB1801439.9, dated Jul. 11, 2018, 7 pages.
European Examination Report for European Application No. 19152652.4, six pages, dated Jul. 1, 2020.

* cited by examiner

VALVE APPARATUS

CROSS RELATED APPLICATION

This application claims priority to United Kingdom (GB) Patent Application 1801439.9, filed Jan. 29, 2018, the entire contents of which are hereby incorporated by reference.

FIELD OF THE INVENTION

The present invention relates to a valve apparatus for an aircraft fuel system, an aircraft assembly, a valve assembly, a valve sensor and a method for monitoring the operability of the same.

BACKGROUND OF THE INVENTION

Actuated valves are widely used in a variety of environments, including in applications within combustible environments, such as aircraft fuel tank systems. In such arrangements, the valve actuator is situated remotely from the valve itself so that the valve actuator is external from the fuel tank system.

It is known to use monitoring systems to determine when maintenance on such components should be performed. Such known means for monitoring the operability of actuated valves are generally performed at the valve actuator with the position of the valve being determined by the position of the valve shaft proximal to the valve actuator.

Known sensing means are also typically unsuitable for use within a combustible environment, such as within an aircraft fuel tank system.

It is therefore desirable to provide an improved valve apparatus capable of more reliably determining the position of the valve, and hence being capable of detecting valve failure. Furthermore, it is desirable for said valve apparatus to be suitable for use within a combustible environment, such as an aircraft fuel tank.

The present invention aims to solve at least one of the aforementioned problems associated with known actuated valves.

SUMMARY OF THE INVENTION

A first aspect of the invention provides a valve apparatus for an aircraft fluid system comprising a valve housing having a fluid flow path, a valve member configured to move between a first position in which fluid is able to flow along the fluid flow path, and a second position in which the fluid flow path is at least partially restricted, a valve member drive means configured to operate the valve member and configured to be operated by an actuator external to the housing, and a sensor configured to monitor a feature in the valve housing to determine the position of the valve member.

By monitoring a feature in the valve housing, i.e. close to the valve member, the number of components between the valve member and the sensor, and therefore the number of components that are assumed to be operating correctly in order for a failure to be detected is significantly reduced. Therefore, the valve apparatus is able to more reliably determine the position of the valve member, and can therefore more directly detect valve failure. This allows the valve apparatus to more reliably detect valve failure due to failure at the valve member drive means. As such, the overall reliability of determining operation of the valve is improved.

The feature that the sensor is configured to monitor may be the valve member. By measuring the valve member directly, the number of components between the valve member and the sensor is further reduced, which equates to a further improvement in reliability when determining the position of the valve member.

The sensor may be an optical sensor. The feature of an optical sensor enables the number of electrical components to be reduced, which is often desirable when the valve apparatus is used in combustible environments.

The optical sensor may have an optical sensor gate on the valve member.

The optical sensor gate may be isolated from fluid able to flow along the fluid flow path. The valve housing may isolate the optical sensor gate from the fluid able to flow along the fluid flow path. The valve housing may be configured to be disposed in a fluid tank of an aircraft fluid system.

The sensor may have an optical signal pathway, wherein the optical sensor gate comprises an optical signal transfer path configured to be moved into and out of alignment with the optical signal pathway.

The optical sensor gate may be fluidly isolated. That is, isolated from the fluid flow path, and from fluid flowable along the fluid flow path.

The optical signal transfer path may comprise an optical member, and optionally the optical member is an optical rod. The optical rod may be a glass rod. Alternatively, the optical rod may be any other suitable optical material.

The valve apparatus may comprise an optical input and an optical output, with the optical signal pathway extending between the optical input and the optical output. Ends of the input pathway section and the output pathway section may be disposed adjacent to the optical sensor gate.

The optical signal pathway may comprise an input pathway section between the optical input and the optical signal transfer path, and an output pathway section between the optical signal transfer path and the optical output.

The optical input may be a first optical input and the valve apparatus may comprise a second optical input, wherein the optical signal transfer path is configured to communicate the first optical input with the optical output when the valve member is in the first position, and the optical signal transfer path is configured to communicate the second optical input with the optical output when the valve member is in the second position.

The optical output may be a first optical output and the valve apparatus may comprise a second optical output, wherein the optical signal transfer path is configured to communicate the optical input with the first optical output when the valve member is in the first position, and the optical signal transfer path is configured to communicate the optical input with the second optical output when the valve member is in the second position.

The optical input may be a first optical input, the optical output may be a first optical output, the optical signal pathway may be a first optical signal pathway, and the valve may further comprise a second optical input, a second optical output and a second optical signal pathway extending between the second optical input and the second optical output, wherein the optical signal transfer path is configured to be in alignment with the first optical signal pathway when the valve member is in the first position, and the optical signal transfer path is configured to be in alignment with the second optical signal pathway when the valve member is in the second position.

The input pathway section and output pathway section may be optical conduits. The optical conduits may comprise an optical material. The optical material may be glass.

The optical conduits have the advantage of reducing attenuation of the signal when passing from the optical input to the optical output.

The optical input and the optical output may be remote from the valve housing. The valve housing may be configured to be disposed on an opposing side of a barrier to the optical input and the optical output.

The valve member may be configured to close the fluid flow path in the second position.

A further aspect of the invention provides a valve assembly comprising the valve apparatus and an actuator. The actuator may be spaced from the valve housing.

A further aspect of the invention provides an aircraft assembly comprising a fluid barrier, and a valve apparatus. The valve housing may be configured to be disposed on an opposing side of the fluid barrier to that of the optical input and the optical output.

The aircraft assembly may comprise a fluid tank, in which the fluid barrier forms a boundary of the fluid tank, the valve housing being located internally in the fluid tank and the optical input and the optical output being located external to the fluid tank.

These features enable the number of electrical components housed within the fluid tank to be further reduced, which is particularly desirable for valve apparatuses used in combustible environments, such as within an aircraft fuel tank.

The valve apparatus may be a rotary valve apparatus. Optionally, the valve apparatus may be a ball valve. Alternatively, the valve apparatus may be a butterfly valve, or may be any other suitable valve type, such as a linear motion valve.

A further aspect of the invention provides a valve sensor for a valve of an aircraft fluid system, the valve sensor comprising an optical input connectable to an optical signal transmitter, the optical input being configured to receive a signal from the optical signal transmitter, an optical output connectable to an optical signal receiver, and an optical signal pathway between the optical input and the optical output, wherein the optical signal pathway comprises an optical sensor gate which is configured to move between a first position and a second position, wherein the optical sensor gate is configured to permit the passage of the signal from the optical input to the optical output when the gate is in the first position, and wherein the optical sensor gate does not permit the passage of the signal from the optical input to the optical output when the optical sensor gate is in the second position.

A further aspect of the invention provides a valve assembly for an aircraft fluid system, the valve assembly comprising: a valve housing having a fluid flow path; a valve member in the valve housing configured to move between an open flow position in which fluid is able to flow along the fluid flow path and a closed flow position in which fluid is prevented from flowing along the fluid flow path; and an optical sensing unit; the optical sensing unit including an optical sensor gate on the valve member in the valve housing; wherein the optical sensing unit is arranged to monitor a position of the optical sensor gate to determine the position of the valve member.

A further aspect of the invention provides a method of determining the position of a valve member for an aircraft fluid system, the method comprising the steps of generating and transmitting an optical signal along an optical signal pathway towards a feature located within the valve housing, the path of the signal being unobstructed when the valve member is in a first position, and the path of the signal being obstructed when the valve member is a second position, providing an optical receiver configured to detect the optical signal after the optical signal has passed the feature, and monitoring the optical signal detected, if any, at the optical receiver so as to determine the position of the valve member.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
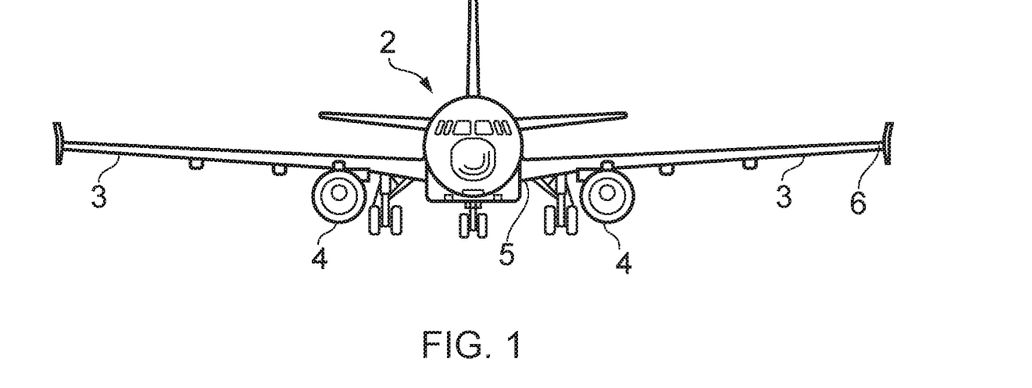
FIG. 1 shows a front view of an aircraft.
Figure 2:
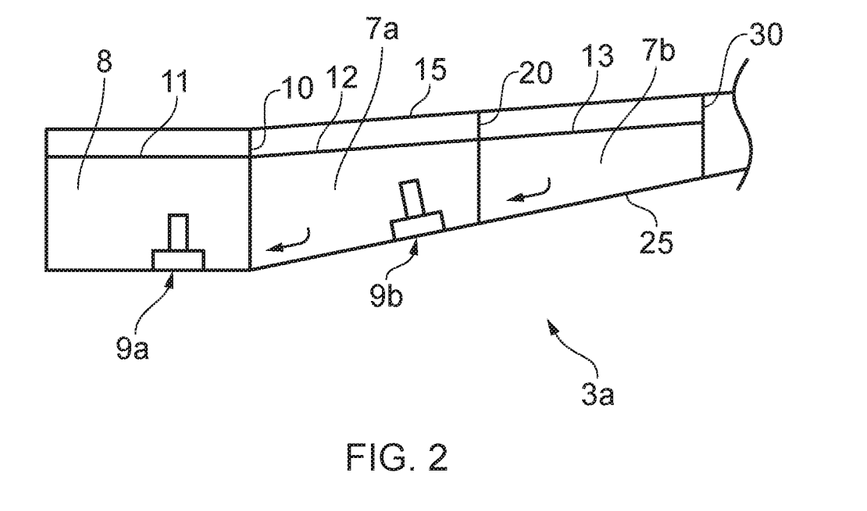
FIG. 2 is a schematic front view through part of a wing of the aircraft including a fuel system.
Figure 3:
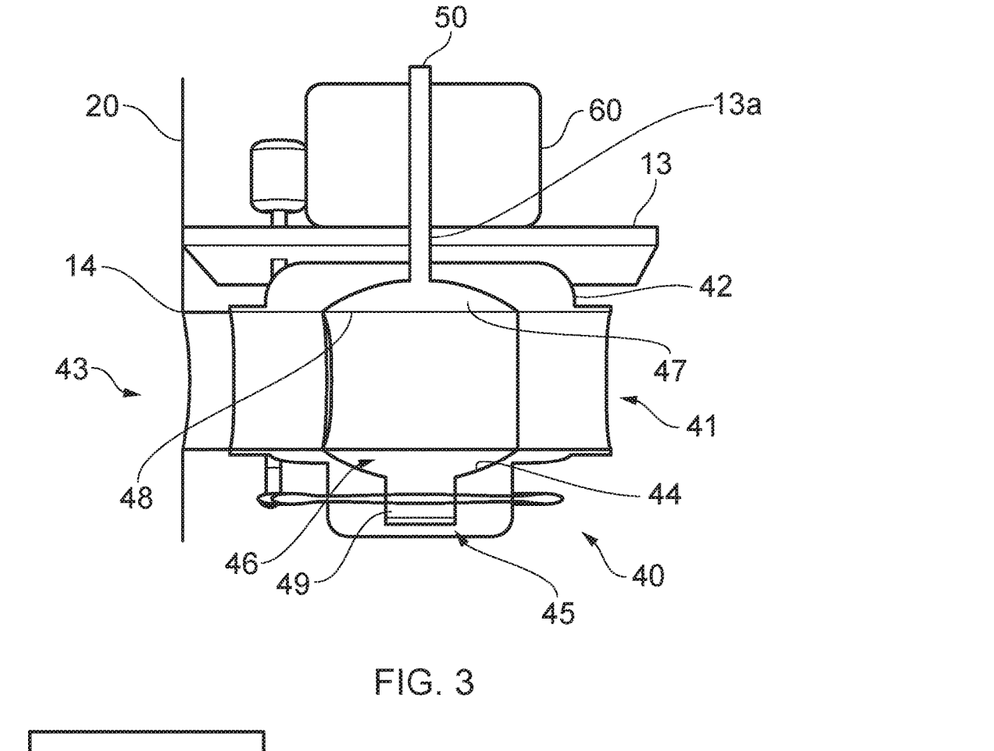
FIG. 3 is a schematic cross-sectional view of a valve apparatus.

FIG. 1 shows an aircraft 1 having a fuel system 3*a* (shown in FIG. 2) including a valve apparatus 40 (shown in FIG. 3). The aircraft has a fuselage 2 and two wings 3 extending from either side of the fuselage 2. Each wing 3 extends in a spanwise direction from a wing root 5 where the wing meets the fuselage 2 to a wing tip 6. Each wing 3 is a dihedral wing, so the wing 3 is angled upwardly as it extends towards the wing tip 6. However, it shall be appreciated that the present invention may also be used in aircraft having anhedral or any other suitable wing design. Engines 4 are located on the underside of each wing 3. FIG. 1 shows a single engine 4 on each wing, however the number and location of the engines may vary depending on the type of aircraft.

FIG. 2 is a schematic cross-sectional view through part of the fuel system 3*a* of the aircraft 1, viewed from the front of the aircraft. FIG. 2 shows the fuel system 3*a* within the port wing 3, the fuel system in the starboard wing being identical. The wing 3 includes a pair of spars (not shown) extending in a spanwise direction, and a number of substantially planar ribs 10, 20, 30 extending in a chordwise direction (perpendicular to the plane of FIG. 2) and located at intervals along the span of the wing 3. The wing 3 also has an upper skin 15 and a lower skin 25. The fuel system 3*a* shown in FIG. 2 includes three fuel tanks 7*a*, 7*b*, 8 which are separated from each other by the ribs 10, 20. Each fuel tank has a lower wall provided by the skin 25; an upper wall provided by boundary portions 11, 12, 13; fore and aft walls provided by the spars (not shown); and inboard and outboard walls provided by a pair of the ribs. The lower wall, upper walls, fore and aft, and inboard and outboard walls all provide a set of fluid barriers preventing fluid from escaping each fuel tank 7*a*, 7*b*, 8 respectively. Alternatively, the fuel tanks 7*a*, 7*b*, 8 may be provided as separable, discrete fuel tanks within the wing or fuselage structure.

The fuel tanks 7*a*, 7*b* and 8 as shown in FIG. 2 comprise centre tank 8 in the fuselage 2; inboard tank 7*a* at the root 5 of the port wing and bounded by the ribs 10, 20; and outboard tank 7*b* bounded by the ribs 20, 30. The port wing may have further fuel tanks (not shown) outboard of the rib 30.

The fuel tanks 7*a*, 7*b*, 8 are arranged to carry fuel when the aircraft and thus the fuel system 3*a* is in use, and the fuel is fed to the engines 4 by a fuel delivery system including pumps 9*a*, 9*b*. The fuel system 3*a* also comprises a number of valves (shown in FIG. 3) located along the ribs 10, 20 to allow fuel to be transferred between the fuel tanks 7*a*, 7*b* and 8 respectively.

FIG. 3 shows the valve apparatus 40 of the fuel system 3*a*. The valve apparatus 40 comprises a valve housing 42 having an inlet 41, an outlet 43 and an internal chamber 44, the inlet 41, outlet 43 and the internal chamber 44 together forming a fluid flow path across the valve housing 42. A valve member 46 is housed within the internal chamber 44 of the valve housing 42, the valve member 46 being positioned in the fluid flow path. An optical sensor 45, acting as a valve sensor, is configured to monitor the position of the valve member within the valve housing 42. The optical sensor 45 shall be described in greater detail later in this application with reference to FIGS. 5, 6 and 7. The optical sensor 45 is at least partly disposed in the valve housing 42.

The valve member 46 has a substantially spherical body portion 47 having a channel 48 extending therethrough and a projection 49 extending downwardly from the body portion 47. Optionally, the internal chamber 44 may further comprise a seal around the valve member 46 to prevent the ingress of fluid into the internal chamber 44.

The channel 48 of the valve member 46 is configured to align with the inlet 41 and outlet 43 of the valve housing 42 when the valve member 46 is in a first, open, position to enable the flow of fluid along the fluid flow path. In FIG. 3, the outlet 43 is positioned at an opening 14 in the rib 20 such that fluid is permitted to pass from the outboard tank 7*b*, along the fluid flow path across the valve housing 42 and through the opening 14 into the inboard tank 7*a* when the valve member 46 is in the first, open position. Alternatively, the outlet 43 may be positioned at another opening in another rib 10 such that the fluid passes from the inboard tank 7*a*, along the fluid flow path across the valve housing 42 and through the other opening into the centre tank 8. In yet a further alternative, the inlet 41 may be positioned at opening in the rib 10, 20 such that fluid passes from either the outboard tank 7*b* or inboard tank 7*a*, through the opening and along the fluid flow path across the valve housing 42 into the inboard 7*a*, or centre 8, tank.

The internal chamber 44 has a shape corresponding to that of the valve member 46, with the diameter of the internal chamber 44 being slightly larger than that of the valve member 46 so as to allow the valve member 46 to freely rotate within the internal chamber 44. The valve member 46 is attached to a valve member drive means 50 which extends from the valve member 46, passes through the valve housing 42, and through an aperture 13*a* in the boundary portion 13 of the tank 7*b* to an actuator 60 spaced remotely from the valve apparatus 40. The valve member drive means 50 is shown in FIG. 3 as being integrally formed with the valve member 46. However, in an alternative embodiment, the valve member drive means 50 may be connected to the valve member 46 using any suitable method of joining or linkage.

The actuator 60 is disposed on an opposite side of the boundary portion 13 to that of the valve housing 42 such that the valve housing 42 is disposed internally within the outboard tank 7*b* and the actuator 60 is disposed external to the inboard tank 7*b*, spaced from the valve housing 42.

The actuator 60 is configured to apply an actuating force to the valve member drive means 50 which in turn transfers the actuating force to the valve member 46 causing the valve member 46 to rotate. The actuator 60 is operable to move the valve member 46 between the first, open, position in which fluid is able to freely flow along the fluid flow path and a second, closed, position in which the fluid flow path is blocked by the valve member body 47 such that fluid is not able to flow along the fluid flow path. Alternatively, the valve member body 47 may only partially block the fluid flow path when the valve member 46 is in the second position such that the flow of fluid is only partially restricted along the fluid flow path.

Figure 4:
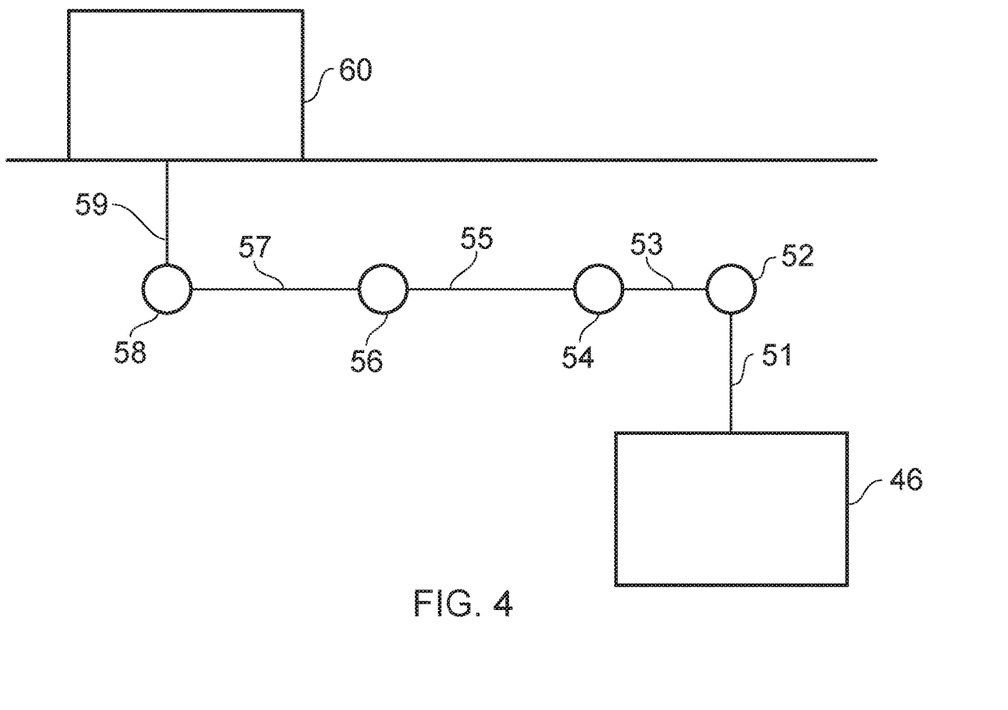
FIG. 4 is a schematic illustration of a valve member drive means between a valve actuator and a valve member.

Although the valve actuator 60 is shown proximate to the valve apparatus 40 in FIG. 3, this picture is merely a schematic and in embodiments, the valve member drive means 50 may often span a significant distance in order to transfer the actuating force from the actuator 60 to the valve member 46 as is shown in FIG. 4, in which the valve apparatus 40 is located proximate to the lower wall of the fuel tank.

The valve member drive means 50 comprises a plurality of drive shafts 51, 53, 55, 57, 59 and mechanical linkages 52, 54, 56, 58, such as universal joints, configured to transfer the actuating force from the actuator 60 to the valve member 46. This enables the actuator to operate the valve member 46 to move between the first and second positions. However, it shall be appreciated that the number of shafts and linkages may vary. For example, the valve member drive means may comprise a single drive shaft. Alternatively, the valve member drive means 50 may comprise a single mechanical linkage. Furthermore, the valve member drive means 50 may include a gearbox, or a plurality thereof.

The sensor 45 of the valve apparatus 40 shall now be described in greater detail with reference to FIGS. 5, 6 and 7. The sensor 45 comprises first and second optical inputs 70, 72 and first and second optical outputs 74, 76. First and second optical signal pathways extend from the first and second optical inputs 70, 72 to the first and second optical outputs 74, 76 respectively via an optical sensor gate 62 housed in the projection 49 of the valve member 46, shown in FIGS. 6 and 7, the optical sensor gate 62 forming part of the valve member 46.

The first and second optical signal pathways are made up of first and second input pathway sections 61, 63 extending between first and second optical inputs 70, 72 and the optical sensor gate 62 respectively, and first and second output pathway sections 65, 67 extending between the optical sensor gate 62 and the first and second optical outputs 74, 76 respectively. The optical sensor gate 62 together with ends of the first and second output pathway sections 65, 67 in the valve housing 42 together form a sensing unit.

The first and second optical inputs 70, 72 are connectable to first and second optical signal transmitters (not shown), configured to supply first and second optical signals to the first and second optical inputs respectively, and the first and second optical outputs 74, 76 are connectable to first and second optical signal receivers (not shown), configured to detected the first and second optical signals from the first and second optical signal transmitters. However, it should be noted that the first and second optical inputs 70, 72 may alternatively be connected to a single optical signal transmitter via a splitter such that a single optical signal transmitter (not shown) is able to provide a signal to both the first and second optical inputs 70, 72.

Figure 5:
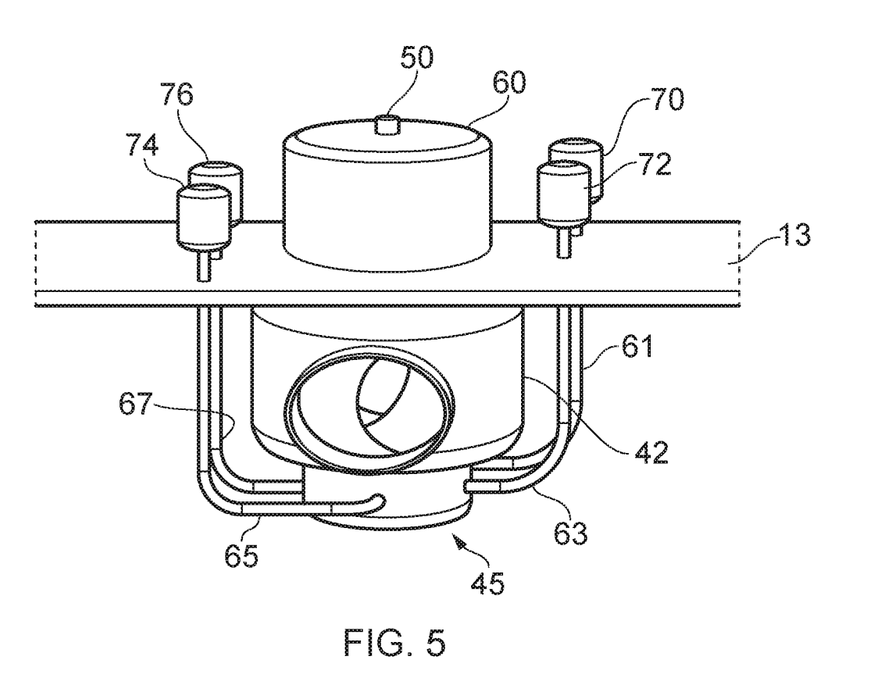
FIG. 5 is a schematic view of the valve apparatus.

As is shown in FIG. 5, the first and second optical inputs 70, 72 and the first and second optical outputs 74, 76 are located remotely from the valve housing 42 and are disposed on the opposite side of the boundary portion 13 to that of the valve housing 42. The valve housing 42 is disposed internally within the outboard tank 7b, whilst the first and second optical inputs 70, 72 and the first and second optical outputs 74, 76 are disposed external to the inboard tank 7b. Disposing the first and second optical inputs 70, 72 and first and second optical outputs 74, 76 externally enables the number of electrical components within the tank to be reduced, which is particularly desirable when the valve apparatus 40 is being used in combustible environments, such as an aircraft fuel system 3a.

In this configuration, the first and second input pathway sections 61, 63 and the first and second output pathway sections 65, 67 are made up of optical conduits. The optical conduits extend from the optical sensor gate 62 to the respective optical inputs and outputs. Typically, the optical conduits extend continuously from the optical sensor gate 62 to the respective optical input and output (i.e. without any gaps).

The valve housing 42 is disposed in the fuel tank 7b. The valve housing 42 is within the boundary of the fuel tank, that is within the fluid barriers of the tank. The valve housing 42 is separate from the fluid barrier. The sensing unit is disposed on the fluid containing side of the tank boundary. The optical inputs 70, 72 and the optical outputs 74, 76 are disposed external to the fluid containing side. The valve housing 42 fluidly isolates the sensing unit from the fluid in the fuel tank 7b.

However, it shall be appreciated that the first and second optical inputs 70, 72, first and second optical outputs 74, 76 and the valve housing 42 may alternatively be located on the same side of said boundary, i.e. all located within the tank. Due to the closer proximity of the first and second optical inputs 70, 72 and first and second optical outputs 74, 76 to the valve housing 42 in this embodiment, the optical conduits may also be omitted.

The optical conduits have a diameter typically in the region of up to 4 mm, preferably 2 m to 4 mm, although it shall be appreciated that conduits outside this range may be used. The optical conduit may be a fibre optic cable. The optical conduits are provided with a greater diameter than those typical of fibre optic cables. The use of optical conduits having a substantive diameter allows for better alignment of the optical signal transfer path with the optical signal pathway to provide a greater margin for error when aligning these components. Furthermore, the use of optical conduits has the advantage of reducing signal attenuation between the first and second optical inputs 70, 72 and first and second the optical outputs 74, 76.

The optical sensor gate 62 comprises an optical signal transfer path 62a comprising an optical material, in this case a glass rod, acting as an optical rod, extending therethrough to enable a signal to pass through the optical sensor gate 62 via the optical signal transfer path 62a. The optical signal transfer path 62a extends through a portion of the valve member 46. For example, in FIGS. 6 and 7, the optical signal transfer path 62a extends through the projection 49 of the valve member. The optical rod extends through the projection 49 of the valve member. For example, in FIGS. 6 and 7, the glass rod is incorporated within the projection 49 of the valve member 46. However, it shall be appreciated that the optical signal transfer path 62a may comprise any other suitable optical material or, in a further alternative, may be an empty channel. The optical signal transfer path 62a is distinct and separate from the fluid flow path of the valve apparatus. The juncture of the optical conduits and the optical sensor gate 62 is fluidly isolated. The optical sensor gate 62 is enclosed.

In an alternative embodiment, the optical sensor gate 62 may be omitted. In this alternative embodiment, the channel 48 of the valve member 46 may act as the optical signal transfer path 62a. However, by providing a dedicated optical signal transfer path 62a that is substantially free from fluid, the optical sensor gate 62 has the advantage of reducing the attenuation of the signal when passing through the optical signal transfer path 62a and reducing the risk of a false reading As the valve member 46 is actuated between the first and second positions, the actuation force applied to the valve member 46 is subsequently transferred to the optical sensor gate 62. This causes the optical sensor gate 62 to also move correspondingly to the movement of the valve member 46. The optical sensor gate 62 is configured such that as the valve member 46 moves between the first and second positions, the subsequent movement of the optical sensor gate 62 causes the optical signal transfer path 62a to be moved in and out of alignment with the first and second optical signal pathways. As has been discussed previously, in the illustrated embodiments the actuation force applied to the valve member is a rotation and hence the movement of the valve member 46, and subsequently the optical sensor gate 62 is a rotation. However, it shall be appreciated that in other embodiments, any other suitable actuation force may be used such as a displacement, a translation, a pivot or any other suitable alternative.

Figure 6:
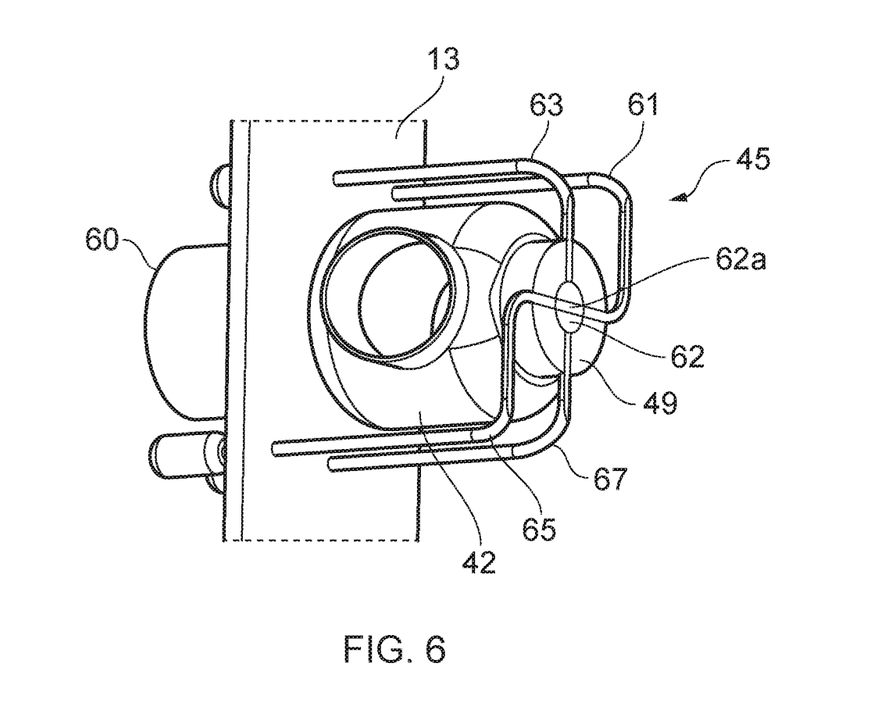
FIG. 6 is a rotated schematic view of the valve apparatus, showing an optical gate in a first position.

When the valve member 46 is in the first position, the optical signal transfer path 62a is configured to align with the first optical signal pathway, whilst the optical signal transfer path 62a is out of alignment with the second optical signal pathway, since the second optical signal pathway is blocked by the optical sensor gate, as shown in FIG. 6. In this configuration, a first signal from the first optical signal transmitter is allowed to pass from the first optical signal transmitter, through the first optical input 70, through the first input pathway section 61, through the optical signal transfer path 62a into the first output pathway section 65 and through the first optical signal output 74 to be received by the first optical signal receiver. However, since the optical signal transfer path 62a is out of alignment with the second optical signal pathway, the second signal from the second optical signal transmitter will not be received at the second optical receiver.

Figure 7:
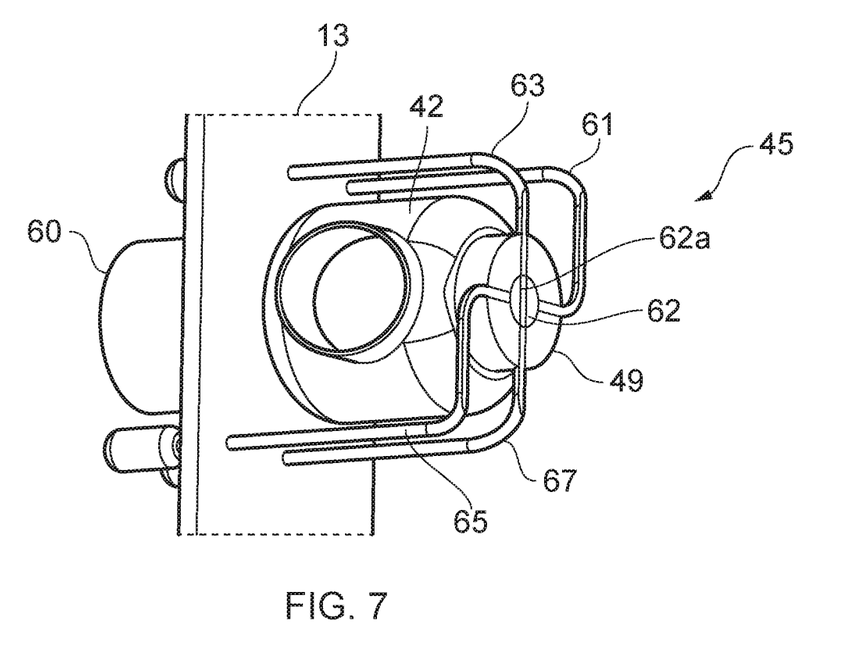
FIG. 7 is a rotated schematic view of the valve apparatus, showing the optical gate in a second position.
Figure 8:
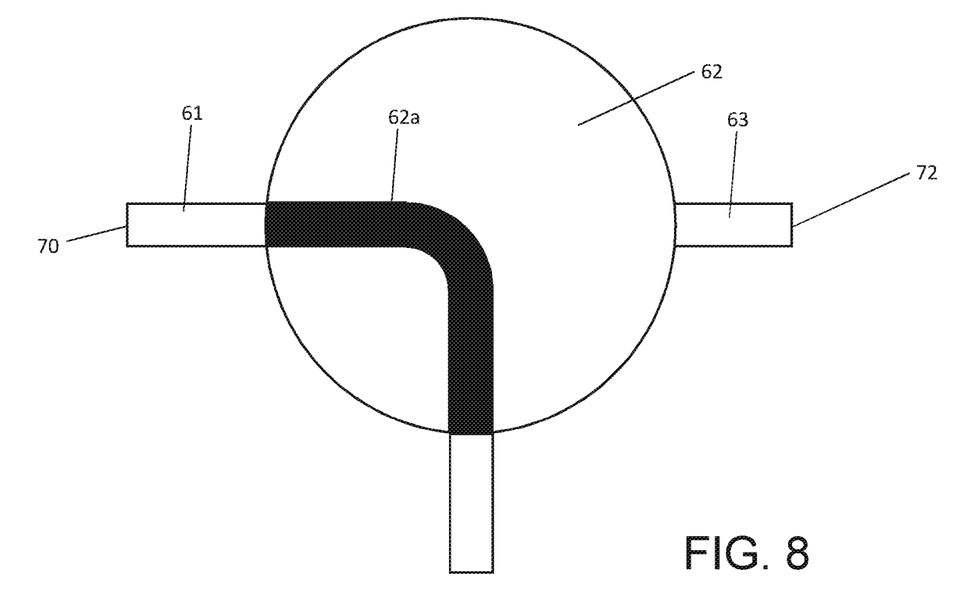
FIG. 8 is a schematic view of the valve apparatus in accordance with a second exemplary embodiment; and, FIG. 9 is a schematic view of the valve apparatus in accordance with a third exemplary embodiment.
Figure 9:
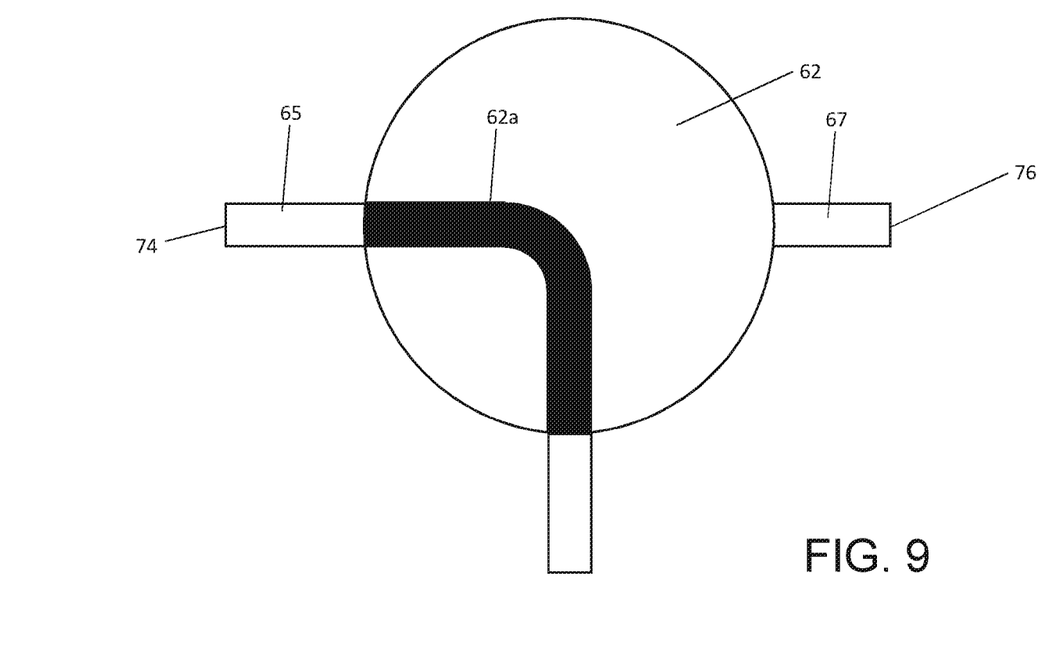

Similarly, when the valve member 46 is in the second position, as shown in FIG. 7, the optical signal transfer path 62a is configured to align with the second optical signal pathway whilst the optical signal transfer path 62a is out of alignment with the first optical signal pathway. In this configuration, the second signal from the second optical signal transmitter is allowed to pass through the second optical input 72, through the second input pathway section 63, through the optical signal transfer path 62a into the second output pathway section 67 and through the second optical signal output 76 to be received by the second optical signal receiver. However, since the optical signal transfer path 62a is now out of alignment with the first optical signal pathway 64, the first signal from the first optical signal transmitter will not be received at the first optical receiver. The first and second optical signal receivers can then feed back to an operator to provide positive indication of the position of the valve member 46. The operator can then compare the indication provided by the sensor 45, be that a positive indication that the valve member 46 is in the first or second position, or no signal in the case where the valve member 46 has stopped between the fully open and fully closed positions, with the command sent to the actuator 60 in order to determine whether the valve member 46 is operating correctly. Typically, this is done via a system of lighting elements configured to illuminate when a signal is received. However, it shall be appreciated that any other suitable feedback system may be used. Since the valve apparatus 40 is able to provide the operator with a positive indication of the position of the valve member 46 when the valve member 46 is in both the first and second positions, any failure preventing the valve member 46 from being positioned correctly in either the first or second position can be easily detected by the operator and thus the occurrence of any valve failures can be more reliably detected. It shall also be appreciated that the operator in this instance may be a computer configured to monitor the operability of the valve member. The computer may then send a corresponding notification that maintenance is needed at the valve member being monitored when a valve failure has been detected.

The optical signal transfer path 62a is configured such that respective optical signal(s) pass through the optical signal transfer path 62a. For example, in embodiments where the optical signal transfer path 62a comprises the optical rod, the respective optical signals pass from one end of the optical rod to the other, when the valve member is in the first and/or second position respectively. When used in conjunction with an optical signal, it shall be appreciated that the valve member 46 must comprise a necessary level of opaqueness to prevent transfer of the signal across the optical sensor gate 62 except via the optical signal transfer path 62a. The optical rod may take differing forms and paths.

A number of alternative embodiments shall now be described without departing from the scope of the appended claims.

In one embodiment, the valve apparatus 40 may comprise a single optical pathway extending between an optical input and an optical output. In this embodiment, the sensor can be configurable to provide a positive indication that the valve member 46 is in the first position, or that the valve member 46 is in the second position. This enables any failures that prevent the valve member 46 from being positioned correctly in the first position to be easily detected. However, this arrangement does not provide a positive indication when the valve member is in the second position, or vice versa.

In another embodiment, the valve apparatus 40 may comprise first and second optical inputs and a single optical output. In this embodiment, similarly to the embodiment described in FIGS. 5-7, first and second input pathway sections 61, 63 extend between first and second optical inputs 70, 72 and the optical sensor gate 62. An output pathway section also extends from the optical sensor gate 62 to the optical signal output. The first and second optical inputs 70, 72 are connectable to first and second optical transmitters, configured to supply first and second optical signals to the first and second optical inputs 70, 72 respectively. In this embodiment, the first and second optical signals provided by the first and second optical signal transmitters are distinguishable from one another. For example, the first optical signal may be a constant, flat signal, whereas the second optical signal may be a pulsed signal, although it shall be appreciated that any other suitable signal variants may be used.

When the valve member 46 is in the first position, the optical signal transfer path 62a is configured to communicate the first input pathway section 61 with the output pathway section, such that the first, flat signal is able to pass from the first optical signal transmitter, through the first optical input 70, through the first input pathway section 61, through the optical signal transfer path 62a, through the output pathway section and into the optical output. Similarly, when the valve member 46 is in the second position, the optical signal transfer path 62a is configured to communicate the second input pathway section 63 with the output pathway section, such that the second, pulsed signal is able to pass from the second optical signal transmitter, through the second optical input 72, through the second input pathway section 63, through the optical signal transfer path 62a, through the output pathway section and into the optical output. The optical signal output is connectable to an optical signal receiver which is capable of distinguishing between the first and second signal types and is therefore able to determine whether the valve member 46 is in the open or closed position based on the type of signal received.

In this embodiment, the first and second input pathway sections 61, 63 are typically disposed at approximately 90° from the output pathway section. The first and second input pathway sections 61, 63 are also typically disposed on opposing sides of the optical sensor gate 62. The optical signal transfer path 62a is shaped to enable the optical signal transfer path 62a to align with the first input pathway section 61 and the output pathway section when the valve member 46 is in the first position, and to align with the second input pathway section 63 and the output pathway section when the valve member 46 is in the second position. This is typically achieved via an optical signal transfer path 62a with a 90° bend. However, it shall be appreciated that any other suitable arrangement may be used.

In another alternative, the valve apparatus 40 may comprise a single optical input and first and second optical outputs 74, 76. In this embodiment, first and second output pathway sections 65, 67 extend between the optical sensor gate 62 and first and second optical outputs 74, 76, similarly to the embodiment illustrated in FIGS. 5, 6 and 7. An input pathway section also extends between the optical signal input to the optical sensor gate 62. Similarly to the alternative embodiment described above, the first and second output pathway sections 65, 67 are typically disposed at approximately 90° from the input pathway section and the first and second output pathway sections 65, 67 are also typically disposed on opposing sides of the optical sensor gate 62. The optical signal transfer path 62a also typically comprises a 90° bend so as to enable the optical signal transfer path 62a to align the input pathway section with the first output pathway section 65 when the valve member 46 is in the first position and to enable the optical signal transfer path 62a to align the input pathway section with the second output pathway section 67 when the valve member 46 in the second position. However, it shall be appreciated that any other suitable arrangement may be used.

When the valve member 46 is in the first position, a signal is able to pass from an optical signal transmitter, through the optical input, through the input pathway section, through the optical signal transfer path 62a, through the first output pathway section 65 and into the first optical output 74. Similarly, when the valve member 46 is in the second position, the signal is able to pass from the optical signal transmitter, through the optical input, through the input pathway section, through the optical signal transfer path 62a, through the second output pathway section 67 and into the second optical output 76. Similarly to the valve apparatus 40 described in the illustrated embodiment, the first and second optical outputs 74, 76 are connectable to first and second optical signal receivers. The first and second optical signal receivers can then feedback to an operator to provide positive indication of the position of the valve member 46 in much the same way as has been described in relation to the illustrated embodiment.

In yet a further alternative, the valve apparatus may comprise additional optical pathways to enable the valve apparatus to provide a positive indication of the position of the valve member when being used in conjunction with a valve system operable between three or more different positions.

Although the aforementioned invention has been described in relation to an optical sensor, it shall be appreciated that the valve apparatus is also applicable for use with an electrical sensor or in conjunction with any other suitable sensor type.

Furthermore, although the valve apparatus has been describe above in relation to a ball valve, it shall be appreciated that the valve apparatus is also applicable for use with a butterfly valve or with any other kind of a rotary valve apparatus. Furthermore, the valve apparatus may also be suitable for use with any other suitable valve type, such as a linear motion valve, a pivoting valve or other like valves.

Although the valve apparatus above has been described in relation to an aircraft fuel tank system, it shall be appreciated that the valve apparatus may also be used in any other suitable aircraft tank, such as an aircraft vent tank, or in any other suitable tanks for a combustible fluid, such as an automotive fuel tank or a gas storage tank. Furthermore, the valve apparatus may also be used in any suitable non-combustible tank applications, such as water storage tanks, be it on an aircraft or for use in wider non-aerospace applications.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft assembly, comprising:
   a fluid tank;
   a fluid barrier forming a part of a wall of the fluid tank; and,
   a valve apparatus for an aircraft fluid system comprising:
      a valve housing having a fluid flow path;
      a valve member configured to move between a first position in which fluid is able to flow along the fluid flow path, and a second position in which the fluid flow path is at least partially restricted;
      a valve member drive means configured to operate the valve member and configured to be operated by an actuator external to the valve housing;
      an optical sensor configured to monitor a feature in the valve housing to determine the position of the valve member;
      wherein the optical sensor comprises an optical sensor gate on the valve member;
      wherein the optical sensor gate is isolated from fluid able to flow along the fluid flow path;
      an optical signal pathway, wherein the optical sensor gate comprises an optical signal transfer path configured to be moved into and out of alignment with the optical signal pathway;
      an optical input and an optical output, and wherein the optical signal pathway extends between the optical input and the optical output;
      wherein the valve housing is configured to be disposed on an opposing side of the fluid barrier to that of the optical input and the optical output; and,
      wherein the fluid barrier comprises an internal side and an opposing external side, the valve housing being inside the fluid tank and attached on the internal side of the fluid barrier, and the optical input and the optical output being outside the fluid tank and attached on the external side of the fluid barrier external to the fluid tank.

2. The aircraft assembly of claim 1, wherein the feature that the sensor is configured to monitor is the valve member.

3. The aircraft assembly of claim 1, wherein the valve housing isolates the optical sensor gate from the fluid able to flow along the fluid flow path.

4. The aircraft assembly of claim 1, wherein the valve housing is configured to be disposed in a fluid tank of an aircraft fluid system.

5. The aircraft assembly of claim 1, wherein the optical signal transfer path comprises an optical rod.

6. The aircraft assembly of claim 1, wherein the optical input is a first optical input, the valve apparatus comprising a second optical input, wherein the optical signal transfer path is configured to communicate the first optical input with the optical output when the valve member is in the first position, and the optical signal transfer path is configured to communicate the second optical input with the optical output when the valve member is in the second position.

7. The aircraft assembly of claim 1, wherein the optical output is a first optical output, the valve apparatus comprising a second optical output, wherein the optical signal transfer path is configured to communicate the optical input with the first optical output when the valve member is in the first position, and the optical signal transfer path is configured to communicate the optical input with the second optical output when the valve member is in the second position.

8. The aircraft assembly of claim 1, wherein the optical input is a first optical input, the optical output is a first optical output and the optical signal pathway is a first optical signal pathway, and the valve apparatus comprises a second optical input, a second optical output and a second optical signal pathway extending between the second optical input and the second optical output, wherein the optical signal transfer path is configured to be in alignment with the first optical signal pathway when the valve member is in the first position, and the optical signal transfer path is configured to be in alignment with the second optical signal pathway when the valve member is in the second position.

9. The aircraft assembly of claim 1, wherein the optical input and the optical output are remote from the valve housing.

10. The aircraft assembly of claim 1, further comprising an actuator, wherein the actuator is spaced from the valve housing.

11. The aircraft assembly of claim 1, wherein the fluid tank is an aircraft fuel tank.

12. An aircraft assembly, comprising:
   a fluid tank of an aircraft wing;
   a space between a boundary portion of the fluid tank and an upper wing skin;
   a fluid barrier forming a part of a wall of the fluid tank; and,
   a valve apparatus for an aircraft fluid system comprising:
      a valve housing having a fluid flow path;
      a valve member configured to move between a first position in which fluid is able to flow along the fluid flow path, and a second position in which the fluid flow path is at least partially restricted;
a valve member drive means configured to operate the valve member and configured to be operated by an actuator external to the valve housing;
an optical sensor configured to monitor a feature in the valve housing to determine the position of the valve member;
wherein the optical sensor comprises an optical sensor gate on the valve member;
wherein the optical sensor gate is isolated from fluid able to flow along the fluid flow path;
an optical signal pathway, wherein the optical sensor gate comprises an optical signal transfer path configured to be moved into and out of alignment with the optical signal pathway;
an optical input and an optical output, and wherein the optical signal pathway extends between the optical input and the optical output;
wherein the valve housing is configured to be disposed on an opposing side of the fluid barrier to that of the optical input and the optical output; and,
wherein the fluid barrier comprises an internal side and an opposing external side, the valve housing being inside the fluid tank on the internal side of the fluid barrier, and the optical input and the optical output being outside the fluid tank and on the external side of the fluid barrier external to the fluid tank in the space between the boundary portion of the fluid tank and the upper wing skin.

13. An aircraft assembly, comprising:
a fluid tank;
a fluid barrier forming a part of a wall of the fluid tank; and,
a valve apparatus for an aircraft fluid system comprising:
a valve housing having a fluid flow path;
a valve member configured to move between a first position in which fluid is able to flow along the fluid flow path, and a second position in which the fluid flow path is at least partially restricted;
a valve member drive means configured to operate the valve member and configured to be operated by an actuator external to the valve housing;
an optical sensor configured to monitor a feature in the valve housing to determine the position of the valve member;
wherein the optical sensor comprises an optical sensor gate on the valve member;
wherein the optical sensor gate is isolated from fluid able to flow along the fluid flow path;
an optical signal pathway, wherein the optical sensor gate comprises an optical signal transfer path configured to be moved into and out of alignment with the optical signal pathway;
an optical input and an optical output, and wherein the optical signal pathway extends between the optical input and the optical output;
wherein the valve housing is configured to be disposed on an opposing side of the fluid barrier to that of the optical input and the optical output; and,
wherein the fluid barrier comprises an internal side and an opposing external side, the valve housing and optical sensor gate being inside the fluid tank on the internal side of the fluid barrier, and the optical input and the optical output being outside the fluid tank and on the external side of the fluid barrier external to the fluid tank.

* * * * *